(12) United States Patent
Dunn et al.

(10) Patent No.: US 7,185,694 B2
(45) Date of Patent: Mar. 6, 2007

(54) SUN SHADE FOR VEHICLES

(75) Inventors: Steven B. Dunn, Beverly Hills, CA (US); Josiah To Sang Li, Monterey Park, CA (US)

(73) Assignee: Munchkin, Inc., Van Nuys, CA (US)

( * ) Notice: Subject to any disclaimer, the term of this patent is extended or adjusted under 35 U.S.C. 154(b) by 683 days.

(21) Appl. No.: 10/053,754

(22) Filed: Jan. 22, 2002

(65) Prior Publication Data
US 2003/0136528 A1 Jul. 24, 2003

(51) Int. Cl.
*B60J 1/20* (2006.01)
(52) U.S. Cl. ............... 160/370.22; 160/127; 160/237; 160/323.1
(58) Field of Classification Search ........... 160/370.22, 160/24, 237, 238, 127, 23.1, DIG. 2, DIG. 3, 160/323.1; 296/97.7, 97.8, 97.9; 40/517
See application file for complete search history.

(56) References Cited

U.S. PATENT DOCUMENTS

| | | | | |
|---|---|---|---|---|
| 3,584,910 A | * | 6/1971 | Lupul | 160/23.1 |
| 4,736,980 A | * | 4/1988 | Eubanks | 160/370.22 X |
| 4,784,426 A | | 11/1988 | Mannisto-Iches | |
| 4,823,859 A | * | 4/1989 | Park | 160/370.22 |
| 4,858,990 A | | 8/1989 | Combs-Rose et al. | |
| 4,947,883 A | | 8/1990 | Mayo | |
| 5,024,479 A | * | 6/1991 | Bryngelson | 296/97.7 |
| 5,036,898 A | * | 8/1991 | Chen | 160/23.1 |
| 5,054,533 A | * | 10/1991 | Lii | 160/370.22 X |
| 5,205,332 A | * | 4/1993 | Lii | 160/370.22 X |
| 5,226,467 A | * | 7/1993 | Lii | 160/370.22 X |
| 5,271,446 A | * | 12/1993 | Hwang | 160/23.1 |
| 5,301,999 A | | 4/1994 | Thompson et al. | |
| 5,330,251 A | * | 7/1994 | McGuire | 160/370.22 X |
| 5,495,884 A | | 3/1996 | Shikler | |
| 5,639,524 A | * | 6/1997 | Lin | 296/97.9 X |
| 6,038,800 A | * | 3/2000 | Seidel | 40/517 |
| 6,138,701 A | | 10/2000 | Zheng | |

* cited by examiner

*Primary Examiner*—David Purol
(74) *Attorney, Agent, or Firm*—Knoble Yoshida & Dunleavy, LLC

(57) ABSTRACT

A sunshade for a vehicle such as an automobile includes a housing that is adapted to be mounted to a vehicle window and a drum member mounted for rotation within the housing about which a flexible, weblike shade element is wound. A retraction mechanism is provided for enabling the shade element to be moved from a first, retracted position wherein most of the shade element is wrapped about the drum member and a second, extended position wherein the shade element is at least partially unwrapped from the drum member. The retraction mechanism includes a biasing mechanism for biasing the drum member so that the shade element is urged toward the first, retracted position, and an arresting mechanism that is constructed and arranged so as to permit the drum member to be stopped when the shade element is in the second, extended position and, in addition, in at least one intermediate position that is between the first, retracted position and the second, extended position. Indicia may be provided on the shade element for informational, educational, entertainment or other purposes, and a number of releasably affixable marker elements may be provided for interaction with the indicia.

40 Claims, 8 Drawing Sheets

SUN SHADE FOR VEHICLES

BACKGROUND OF THE INVENTION

1. Field of the Invention

This invention relates generally to the field of automotive accessories, and more specifically to vehicle sunshades that are attachable to a window of a vehicle for protecting occupants and cargo that are in the vehicle from direct exposure to sunlight.

2. Description of the Related Technology

Prolonged exposure to direct sunlight when in a vehicle may be unpleasant and unhealthy, notwithstanding the fact that the vehicle's windows will tend to filter some of the potentially harmful solar radiation. Direct sunlight may be especially unpleasant for an infant or small child who is confined within a child safety seat and has a limited ability to reposition his or herself. For these reasons, and because there is a growing awareness of the potential danger of overexposure to solar radiation, vehicle sun shades have become a popular automotive accessory.

Unfortunately, some commercially available vehicle sun shades are difficult to position or reposition, as may become desirable depending upon the route of travel and the position of the sun during a long trip. In addition, some designs are such that small fingers may be pinched when operating or playing with the sun shade. A busy parent or other caregiver would be appreciative of any improvements in design for a vehicle sun shade that would minimize the complexity of using and repositioning the sun shade, or that would minimize the potential for injury, no matter how minor.

Additionally, long automobile trips with children are generally more pleasant if activities are available. Keeping this in mind, many parents or other caregivers will be mindful to keep activities such as games, puzzles and books within the vehicle on a long trip. Nevertheless, any additional informational, educational or entertainment activities that may be available on a long trip would be appreciated by most families, particularly if such activities can be made available without consuming a great deal of additional space within the vehicle.

SUMMARY OF THE INVENTION

Accordingly, it is an object of the invention to provide an improved sun shade assembly for use within a vehicle that is safe and convenient to position on the window of a vehicle, and to reposition as the need may be. It is further an object of the invention to provide a sun shade assembly that, in addition to providing effective protection against direct sunlight, presents vehicle occupants with additional informational, educational or entertainment options.

In order to achieve the above and other objects of the invention, a sunshade for a vehicle that is constructed according to a first aspect of the invention may include a housing; first mounting structure for mounting the housing on a vehicle window; a drum member, rotatably mounted with respect to the housing; a flexible, weblike shade element, the shade element being positioned so as to be wrapable about the drum member; and a retraction mechanism for enabling the shade element to be moved from a first, fully retracted position wherein most of the shade element is wrapped about the drum member and a second, extended position wherein the shade element is at least partially unwrapped from the drum member, the retraction mechanism including a biasing mechanism for biasing the drum member so that the shade element is urged toward the first, retracted position, and an arresting mechanism, the arresting mechanism being constructed and arranged so as to permit the drum member to be stopped when the shade element is in the second, extended position and in any of a plurality of predetermined intermediate positions that are between the first, fully retracted position and the second, extended position, the arresting mechanism further comprising controlled retraction structure for permitting a consumer to partially retract said shade element by a controlled predetermined distance; whereby the weblike shade element may be utilized in more than one position wherein it is not being actively biased toward the retracted position.

A sunshade assembly for a vehicle according to a second aspect of the invention includes a flexible, weblike shade element; mounting structure that is constructed and arranged to facilitate mounting of the shade element on a vehicle window; and at least one marker element, the marker element and the shade element being constructed so that the marker element may be affixed to the shade element by a consumer.

A sunshade for a vehicle that is constructed according to a third aspect of the invention includes a housing; first mounting structure for mounting the housing on a vehicle window; a drum member, rotatably mounted with respect to the housing; a flexible, weblike shade element, the shade element being positioned so as to be wrapable about said drum member; a retraction mechanism for enabling the shade element to be moved to any one of a number of different predetermined positions including a first, retracted position wherein most of the shade element is wrapped about the drum member and a second, extended position wherein the shade element is at least partially unwrapped from the drum member; and wherein the housing is shaped and sized so as to preclude a person from being able to touch a portion of the shade element that is wrapped about the drum member, whereby the possibility of the person's fingers being pinched is reduced.

According to a fourth aspect of the invention, a sunshade for a vehicle includes a housing; at least two suction cups, attached to the housing, for mounting the sunshade to a vehicle window; a drum member, rotatably mounted with respect to the housing; a flexible, weblike shade element, the shade element being positioned so as to be wrapable about the drum member; a retraction mechanism for enabling the shade element to be moved to any one of a number of different predetermined positions including a first, retracted position wherein most of the shade element is wrapped about the drum member and a second, extended position wherein the shade element is at least partially unwrapped from the drum member; and wherein the housing is shaped so as to obstruct view of the at least two suction cups from within the vehicle when the sunshade is mounted to the vehicle window, whereby small children will be less likely to be tempted to interfere with the suction cups.

According to a fifth aspect of the invention, a sunshade for a vehicle includes a housing; first mounting structure for mounting the housing on a vehicle window; a drum member, rotatably mounted with respect to the housing; a flexible, weblike shade element, the shade element being positioned so as to be wrapable about the drum member; a retraction mechanism for enabling the shade element to be moved to any one of a number of different predetermined positions including a first, retracted position wherein most of the shade element is wrapped about the drum member and a second, extended position wherein the shade element is at least partially unwrapped from the drum member; a gripping member, mounted to a distal end of the shade element, for facilitating gripping of the shade element by a consumer; and second mounting structure, attached to the gripping member, for mounting the gripping member to a vehicle window, and wherein the gripping member and the second mounting structure are constructed and arranged so as to facilitate disengagement of the second mounting structure from the vehicle window by manipulating said gripping structure.

A sunshade for a vehicle having at least one vehicle door and a vehicle window that can be raised and lowered out of and into the door includes, according to a sixth aspect of the invention, a housing; first mounting structure for mounting the housing on a first portion of the vehicle window; a drum member, rotatably mounted with respect to the housing; a flexible, weblike shade element that is positioned so as to be wrapable about the drum member; a retraction mechanism for enabling the shade element to be moved to any one of a number of different positions including a first, retracted position wherein most of the shade element is wrapped about the drum member and a second, extended position wherein the shade element is at least partially unwrapped from the drum member; a gripping member, mounted to a distal end of the shade element, for facilitating gripping of the shade element by a consumer; and second mounting structure, attached to the gripping member, for mounting the gripping member to a second portion of the vehicle window, and wherein the gripping member and the second mounting structure are constructed and arranged so as to facilitate disengagement of the second mounting structure from the second portion of the vehicle window when the second portion of the vehicle window is attempted to be lowered into the vehicle door.

According to a seventh aspect of the invention, a sunshade for a vehicle may include a housing; first mounting structure for mounting the housing on a vehicle window; a drum member, rotatably mounted with respect to the housing; a flexible, weblike shade element, the shade element being positioned so as to be wrapable about the drum member; and a retraction mechanism for enabling a consumer using just one hand to move the shade element to any one of a plurality of different predetermined indexed positions including a first, retracted position wherein most of the shade element is wrapped about the drum member, a second, extended position wherein the shade element is at least partially unwrapped from the drum member and at least one predetermined indexed intermediate position.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
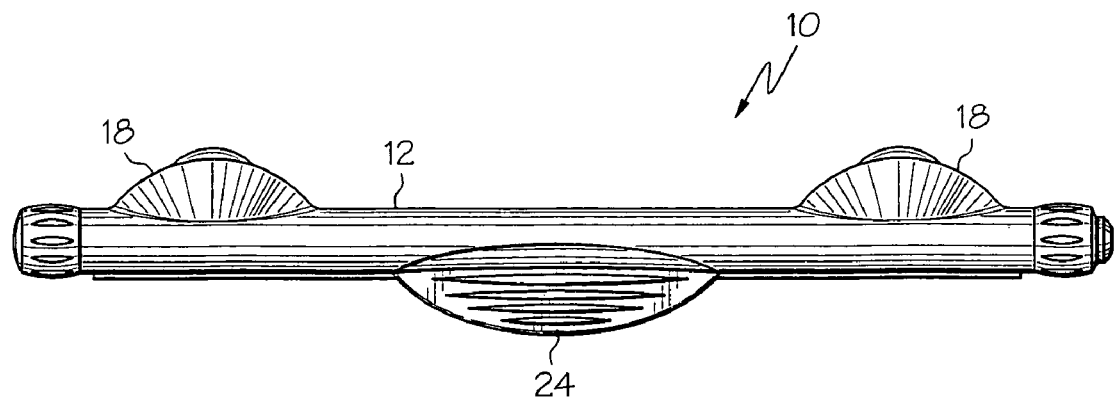
FIG. 1 is a perspective view of a vehicle sun shade assembly that is constructed according to a preferred embodiment of the invention, shown in a first, retracted position.

Referring now to the drawings, wherein like reference numerals designate corresponding structure throughout the views, and referring in particular to FIG. 1, a sun shade 10 that is constructed according to a preferred embodiment of the invention includes a housing 12 that is preferably shaped and sized so as to preclude a person from being able to touch a portion of a shade element 22 that is wrapped about an interior drum member 20, both of which will be described in greater detail below, whereby the possibility of the person's fingers being pinched is reduced. As may best be seen in FIGS. 2 and 3, housing 12 is provided with first mounting structure 14 for mounting the housing 12 and thereby the sun shade 10 to a first portion of a window 23 on a vehicle door 25 that is part of a vehicle such as an automobile. In the preferred embodiment, first mounting structure 14 is embodied as a pair of suction cups 16 that are shaped and sized to adhere to the first portion of the vehicle window 23 with a force that is sufficient to support the weight of the sun shade 10 and, in addition, to resist any forces and accelerations that would be expected during mounting, adjustment and use. Suction cups 16 are preferably mounted symmetrically to each other along a longitudinal axis of the housing 12. As may be seen in FIG. 1, housing 12 includes for aesthetic and safety purposes a pair of rounded projections 18 that extend upwardly from the longitudinal axis of the housing 12 in order to obscure access to and view of the suction cups 16 when the sun shade 10 is mounted to a vehicle window. In addition to the aesthetic benefit that is provided by the rounded projections 18, their presence makes it harder for little fingers to access the periphery of the suction cups 16 during use, which could break the vacuum seal of one or more of the suction cups 16 and cause the sun shade 10 to swing out of position or to fall.

Figure 2:
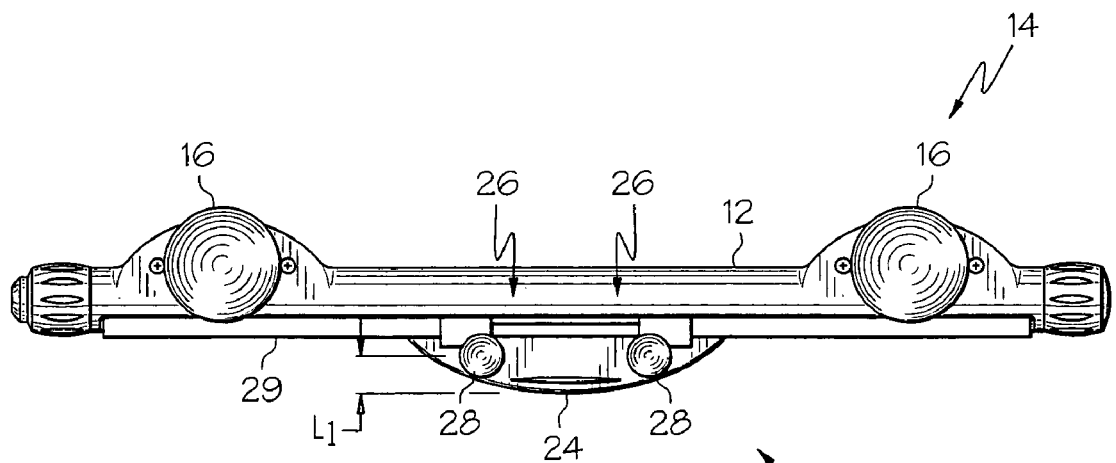
FIG. 2 is a perspective view of the sun shade assembly shown in FIG. 1, depicting a different side of the assembly.
Figure 3:
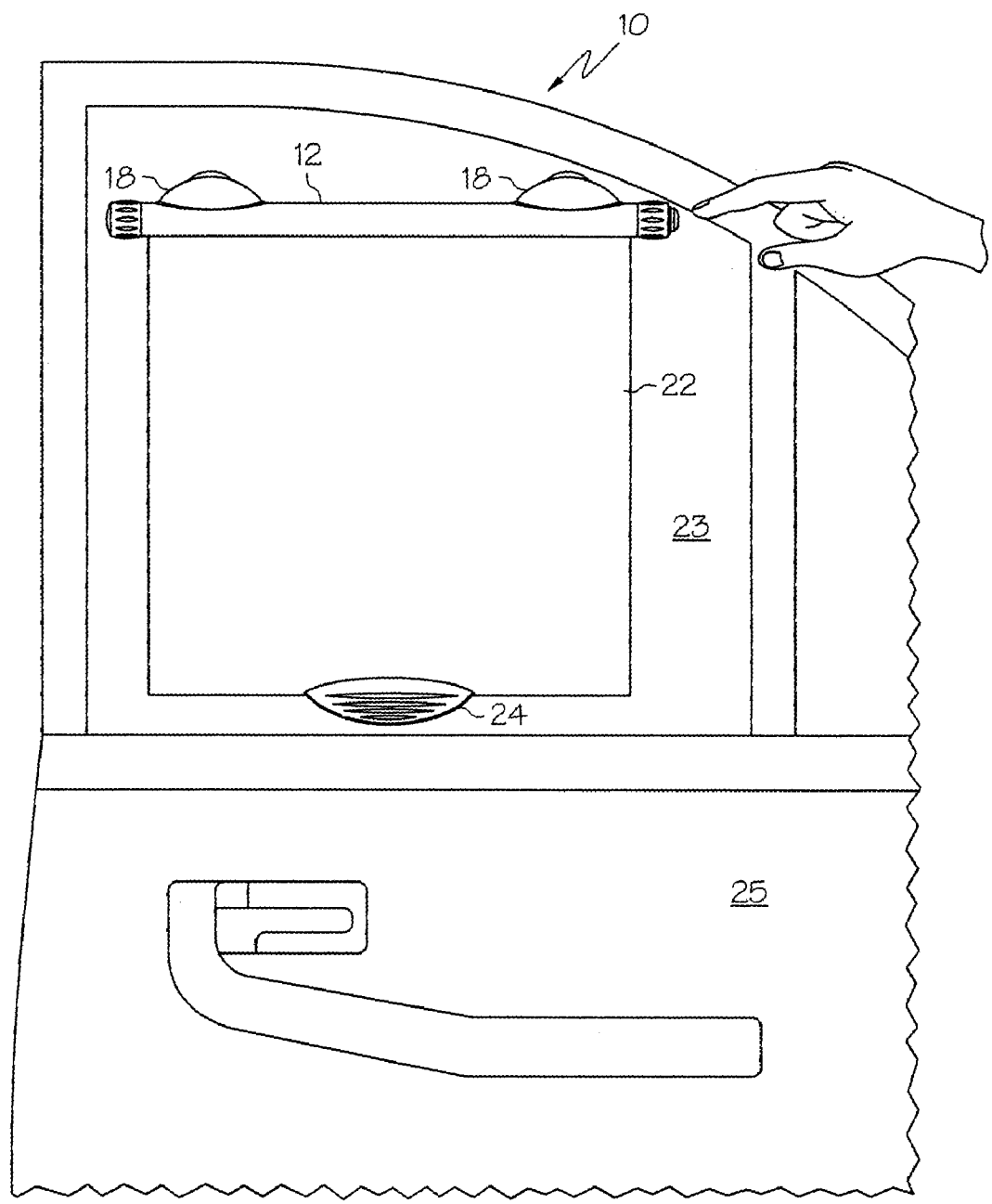
FIG. 3 is a perspective view of the sun shade assembly as shown in FIG. 1, shown in a second, extended position.
Figure 5:
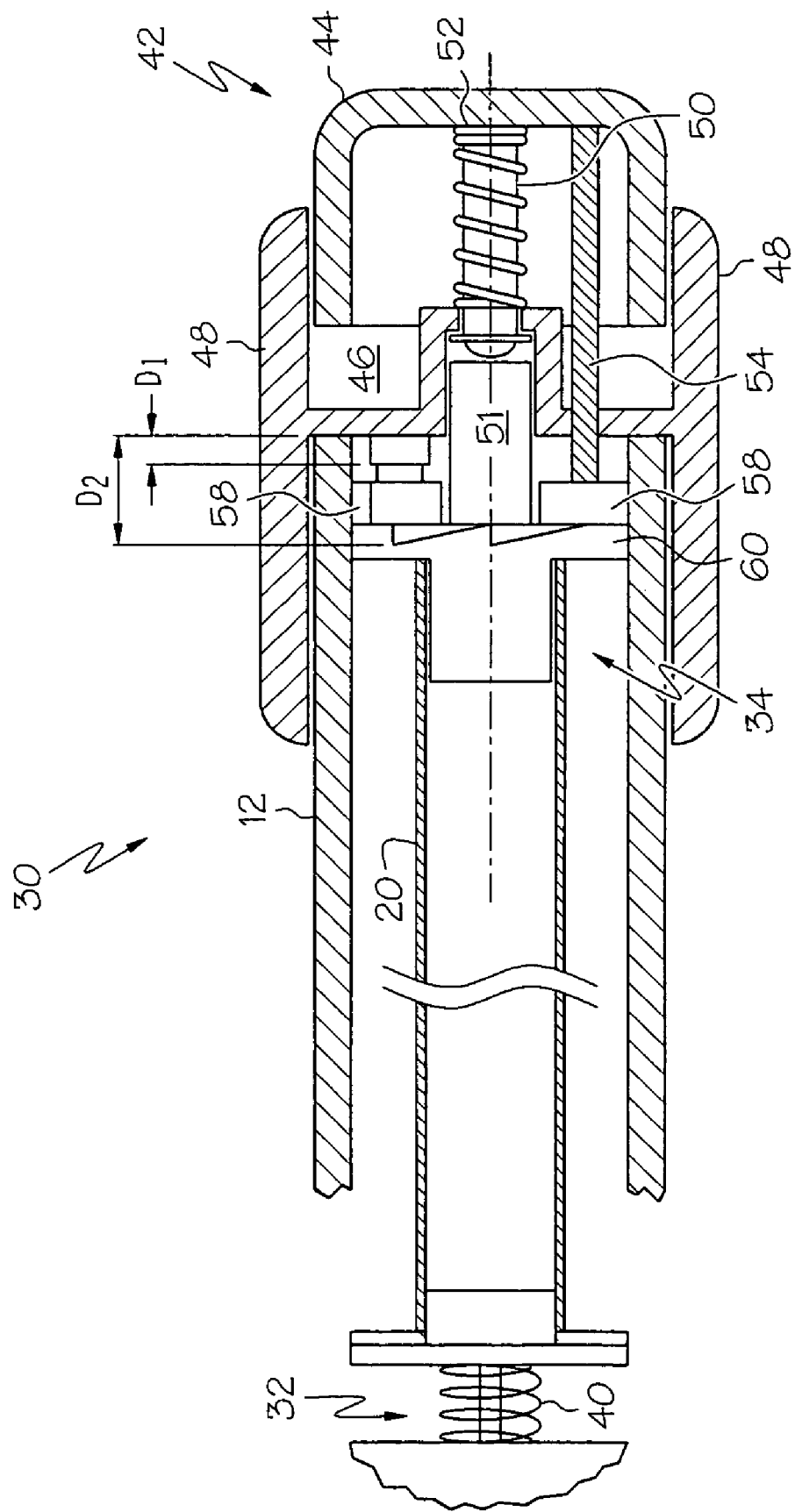
FIG. 5 is a diagrammatical depiction, styled in cross-section, of the retraction mechanism that is depicted in FIG. 4.

Referring briefly to FIG. 5, it will be seen that drum member 20 is rotatably mounted with respect to the housing 12 and, as may best be seen in FIG. 3, a flexible, weblike shade element 22 is wrapped about the drum member 20. A distal end of the flexible, weblike shade element 22 is attached to a gripping element 24, which in the preferred embodiment is molded from a polymeric material such as polyvinyl chloride (PVC), polypropylene or polyethylene and which has second mounting structure 26 provided thereon for mounting the gripping element 24 to a second portion of the vehicle window 23. According to one important aspect of the invention, the second mounting structure 26 and the gripping element 24 are together shaped, sized and constructed in such a manner so as to permit a consumer to disengage the second mounting structure 26 from the vehicle window 23 by manipulating the gripping element 24. Additionally, the second mounting structure 26 and the gripping element 24 are sized, shaped and constructed in such manner that the gripping structure 24 will be engaged by the door 25 if it is attempted to lower the second portion of the vehicle window 23 downwardly into the door 25. This will result in a prying action that will disengage the second mounting structure 26 from the vehicle window 23, preventing damage to the sunshade 10 and the vehicle. In the preferred embodiment that is depicted in FIGS. 2 and 3, it will be seen that the second mounting structure 26 is constructed as a pair of suction cups 28, which are preferably molded so as to be unitary with the gripping element 24. In this embodiment of the invention, it will be seen that the suction cups 28 are aligned with each other along an axis 29 that is generally parallel to the longitudinal axis of the housing 12, and that the gripping element 24 extends outwardly from the housing 12 so as to define a distance $L_1$ between the outermost grippable point of the gripping element 24 and the axis 29 along which the suction cups 28 are situated. This functionally creates a lever arm by which a consumer such as a parent or other caregiver can quickly and easily detach the suction cups 28 from the vehicle window by grasping the gripping element 24 and pulling the outer end of the gripping element 24 away from the vehicle window. Preferably, the distance $L_1$ is within a range of about 0.4 in. to about 2.5 in., and more preferably within a range of about 0.5 in. to about 1.5 in. Furthermore, each of the suction cups 28 are preferably constructed and arranged so as to have an effective force of adhesion to a glass surface that is within a range of about 0.1 lb. of force to about 3.5 lb. of force, and that is more preferably within a range of about 0.5 lb. of force to about 2.8 lb. of force.

An additional benefit of the extended length of the gripping element is that it obscures views of the suction cups 28 to those, such as small children, within the vehicle. As a result, a small child will be less likely to be tempted to manipulate the suction cups 28, which could result in a distraction to the driver of the vehicle. To some extent, it would also interfere with the physical possibility of a small child interfering with the suction cups 28.

Looking again to FIG. 5, sun shade 10 further includes a retraction mechanism 30 that is constructed and arranged to enable the shade element 22 to be moved from a first, retracted position, such as is shown in FIGS. 1 and 2, to a second, extended position, as shown in FIG. 3. In the first, retracted position, most of the shade element 22 is wrapped about the drum member 20, while in the second, extended position most of the shade element 22 is preferably unwrapped from the drum member 20 and is therefore located outside of the housing 12. According to one important aspect of the invention, retraction mechanism 30 includes a biasing mechanism 32 for biasing the drum member 20 so that the shade element 22 is urged toward the first, retracted position. In the preferred embodiment, biasing mechanism 32 is constructed as a helical spring 40, which also exerts a compressive, axial force on the drum member 20, for reasons that will be described in greater detail below.

Retraction mechanism 30 further preferably includes controlled reaction structure that is embodied as an arresting mechanism 34. Arresting mechanism 34 is constructed and arranged to stop the rotation of the drum member 20 when the shade element 22 is positioned in the second, extended position. Advantageously, arresting mechanism 34 is constructed to permit the drum member to be stopped in at least one and, in the preferred embodiment, in a multiplicity of different, predetermined intermediate positions between the fully retracted position and the fully extended position. This permits the consumer to be able to extend the shade element 22 to a desired one of a number of possible different degrees of extension, without the need to use the second mounting structure 26 as an anchor to maintain the position of the shade element 22 against the force that is provided by the biasing mechanism 32. As will become apparent in the more detailed discussion that appears below, arresting mechanism 34 is further constructed so as to facilitate convenient one-handed adjustment of the sun shade 10.

Figure 6:
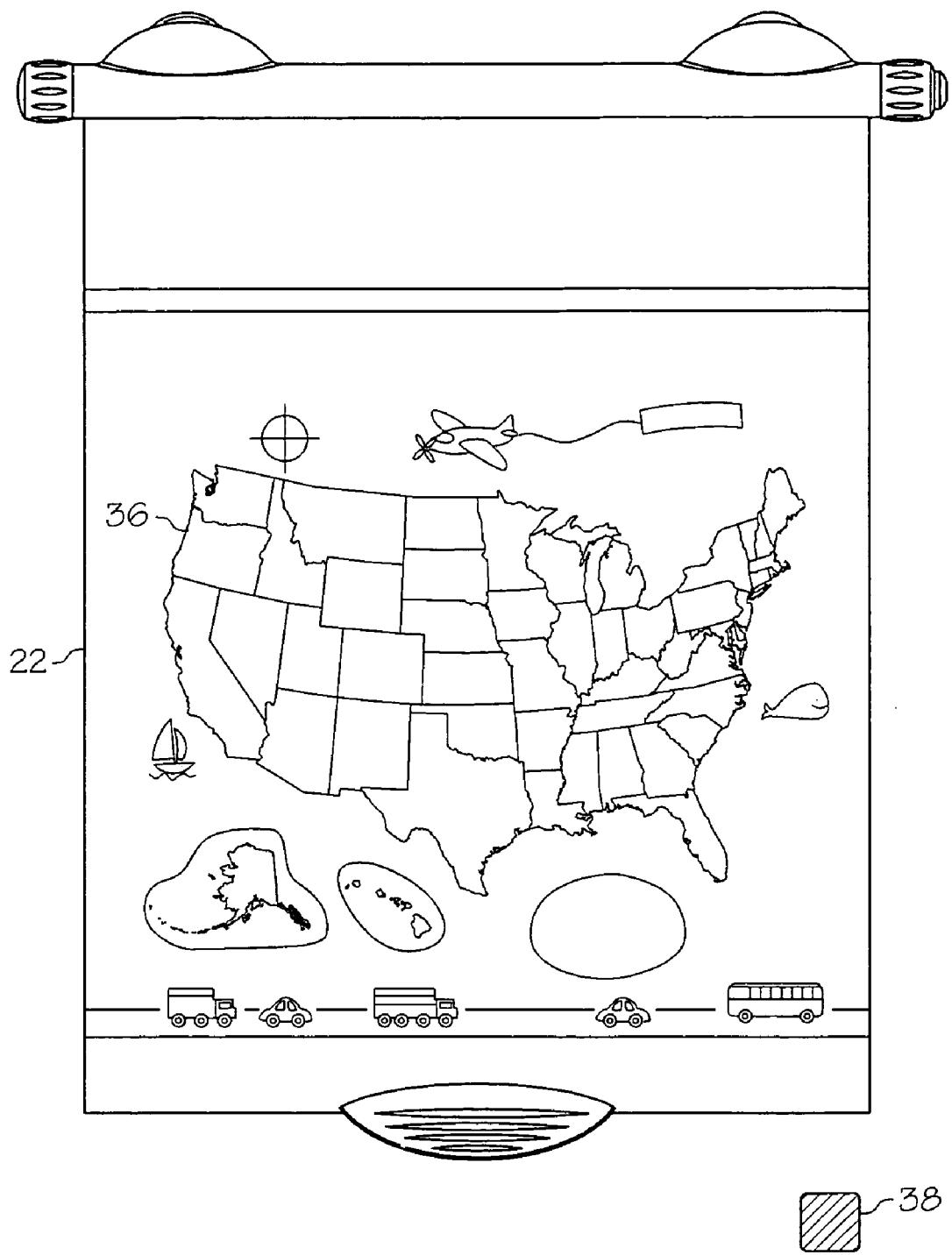
FIG. 6 is a diagrammatical depiction of the vehicle sun shade assembly constructed according to the preferred embodiment of the invention, depicting another aspect of the invention.
Figure 7:
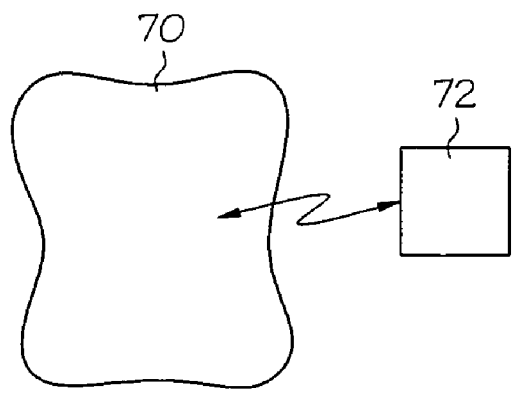
FIG. 7 is a diagrammatical depiction of one embodiment to be used according to the aspect of the invention that is shown in FIG. 6.

According to another important aspect of the invention that is discussed in greater detail below, indicia 36 is preferably provided on a visible surface of a shade element 22 for informational, educational, entertainment or other purposes. As may be seen in FIG. 6, at least one marker element 38 may be provided as part of the sun shade 10 so as to permit a consumer such as a parent or caregiver or child to functionally interact with the indicia 36 for informational, educational, entertainment or other purposes. The marker elements 38 are preferably removably affixable to the shade element 22 by any one of a number of different methods of affixation, several of which are discussed in greater detail below with reference to FIGS. 7–13. The marker elements 38 are preferably shaped, sized and colored so as to be functionally consistent with the intended targets on the indicia 36. In the embodiment that is shown in FIG. 6, a license plate game is printed on the visible surface of the shade element 22, and the marker element 38 may be used to place a mark on a state when that state's license plate is spotted by one of the occupants of the vehicle. In this embodiment, a plurality of such marker elements 38 are provided, and each marker element 38 is sized and shaped appropriately so that it can be placed in an area that is indicative of a particular state. It will be appreciated that an unlimited number of different types of educational presentations, games, or other activities could be performed or facilitated using this concept. For example, conventional games that could be adapted for use with the shade element 22 according to the invention would include Tic tac toe, Checkers, Chinese checkers, Backgammon, Chess, and Pin the tail on the donkey. Educational games could be played that teach children how to spell words, learn the alphabet, etc. Family organizational tasks could be planned and recorded using the shade element 22.

Figure 13:
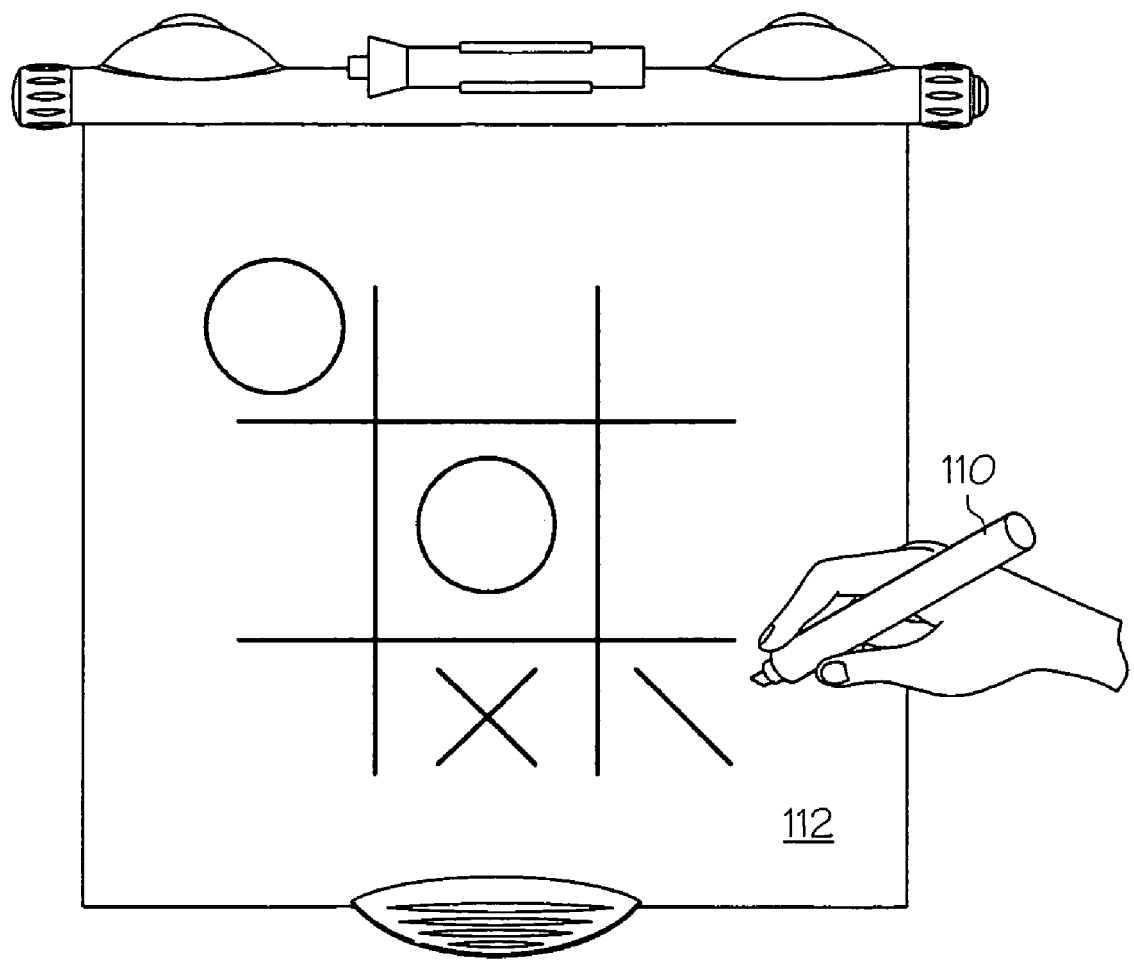
FIG. 13 is a diagrammatical depiction of a sixth alternative embodiment.

In an alternative embodiment that is depicted in FIG. 13, the marker element could be embodied as markings that are made by a writing implement, such as a dry erase marker 110. In this embodiment, the shade element 22 would be fabricated and textured so as to have a surface 112 that is compatible with the selected writing implement. In addition, the housing or the gripping element could be constructed so as to facilitate storage or mounting of the selected writing implement.

Figure 4:
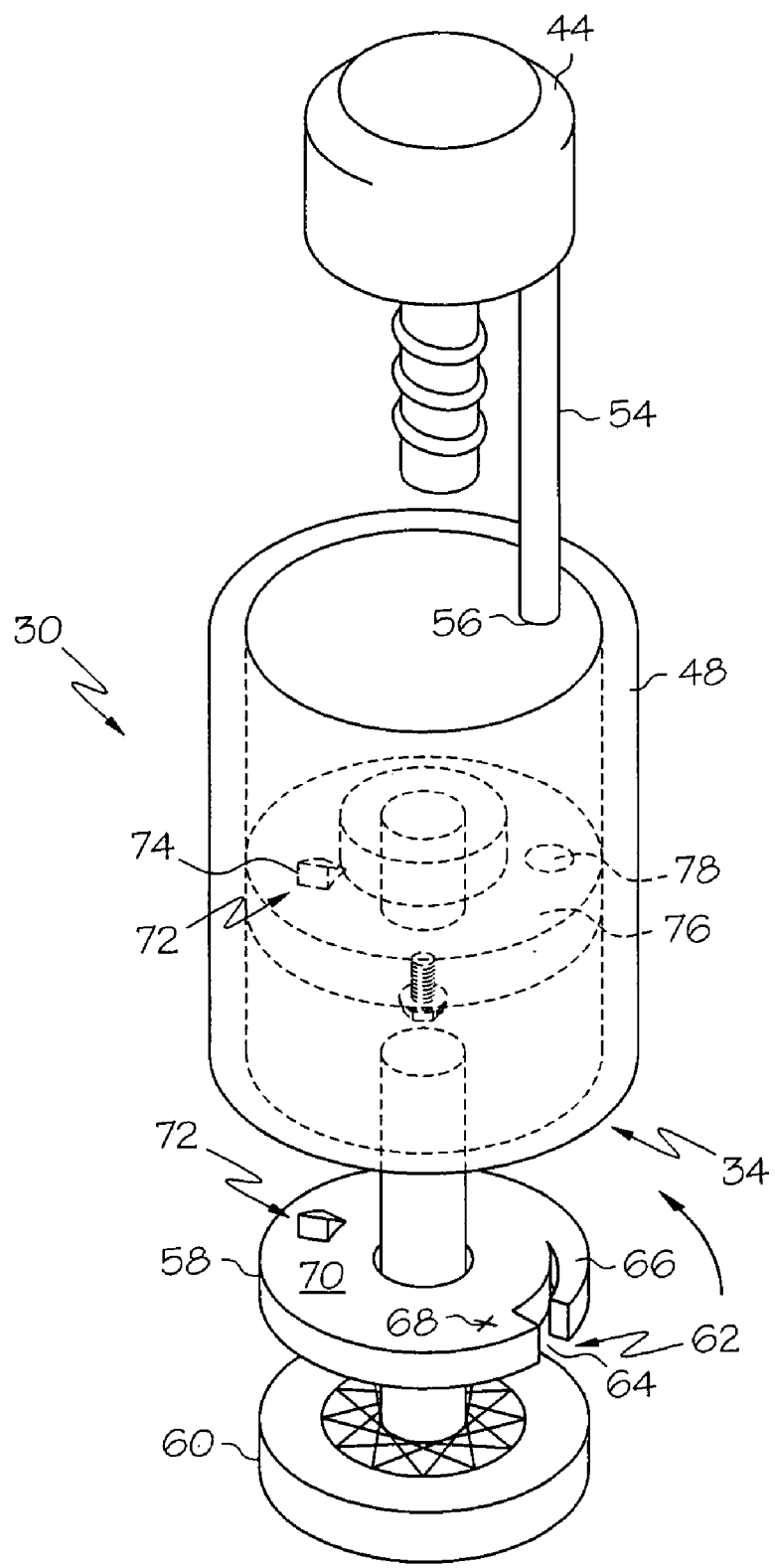
FIG. 4 is an exploded view of a retraction mechanism that is preferably used in the embodiment of the invention that shown in FIG. 1.

Referring now to FIGS. 4 and 5, it will be seen that retraction mechanism 30 further includes a control element 42 that is arranged to be actuatable by a consumer for disengaging the arresting mechanism 34, whereby the force that is applied by the biasing mechanism 32 will urge the drum member 20 to move the shade element 22 toward the retracted position. In the preferred embodiment, control element 42 is configured as a button 44 that is situated for movement parallel to the longitudinal axis of the housing 12 within a cavity 46 that is defined within an end cap member 48 of the housing 12. According to one important aspect of the invention, the control element 42 and the arresting mechanism 34 are constructed and arranged to permit a consumer such as a parent or caregiver to actuate the control element 42 in either one of a first manner, which will cause the shade element to be retracted completely to the first, retracted position, or in a second manner, which will cause the arresting mechanism 34 to reengage after permitting a limited amount of retraction in order to stop the retraction of the shade element 22 in one of the plurality of different possible intermediate positions. As may be seen in FIGS. 4 and 5, a metal pin 54 is mounted for movement with the button 44 and is configured to pass through a hole 78 that is defined in a lateral interior wall 76 of the end cap 48 of the housing 12. Metal pin 54 has a distal end 56 that is adapted to bear against a starting location 68 that is defined in an upper face 70 of a first clutch member 58. First clutch member 58 is ordinarily prevented from rotating with respect to the housing 12 by means of a stop member 72 that protrudes from the upper face 70 and that ordinarily is engaged within a recess 74 that is defined within the lateral interior wall 76. A second clutch member 60 is rotationally fixed to the drum member 20 and frictionally engages the first clutch member 58 so as to preclude rotation of the second clutch member 60 and, accordingly, drum member 20 until the second clutch member 60 becomes axially displaced from the first clutch member 58, as will be described below. As may best be seen in FIG. 4, a recess 62 is defined in the outer periphery of the first clutch member 58 so as to define a stop surface 64 that is positioned within a plane that is substantially perpendicular to the upper face 70 and a sloped surface 66 that is continuous with the upper face 70.

When the sun shade is positioned in full extension, the retraction mechanism 30 will be positioned as it is shown in FIG. 5, with the first clutch member 58 securely locked against rotation as a result of the engagement of the stop member 72 within the recess 74 of the lateral interior wall 76. If the consumer would desire to cause the shade 22 to retract by a small amount, he or she would depress the button 44 by a distance $D_1$ that is schematically depicted in FIG. 5. This would cause the pin 54, with its distal end 56 to exert force on the start location 68 that is located on the upper face 70 of the first clutch member 58, causing the first clutch member 58 together with the second clutch member 60 and the drum member 20 to be displaced axially by a small distance to the left, as it would be viewed in FIG. 5. This would occur against the compressive spring bias that is provided by the spring 40. As this movement takes place, the stop member 72 will become disengaged from the recess 74, and the clutch members 58, 60 together with the drum member 20 will begin to rotate in the counterclockwise direction as indicated by the arrow in FIG. 4. As one complete rotation is completed, however, if the consumer has relieved all pressure on the button 44 stop member 72 will contact the edge of the recess 74 and become reseated within the recess 74. If the consumer continues to apply pressure on the button 44, the stop surface 64 will contact the side of the pin 54, ensuring that motion of the first clutch member 58 is arrested so as to give the consumer in the option of stopping the shade 22 in that position. If the consumer desires to further retract the shade element 22, the button 44 must be released and then again depressed.

If, however, the consumer desires to cause full retraction of the shade element 22, he or she will depress the button 44 by a distance $D_2$ that, as may be seen in FIG. 5, is greater than the distance $D_1$. When the button 44 is depressed to this extent, a pushrod 50 will move axially against a boss 51 that is part of the second clutch member 60, which will cause the second clutch member 60 to axially separate from the first clutch member 58. As this occurs, the second clutch member 60 together with the drum member 20 will be permitted to spin freely under the bias that is provided by the biasing mechanism 32 in order to fully returned the shade element 22 to the retracted position.

Figure 8:
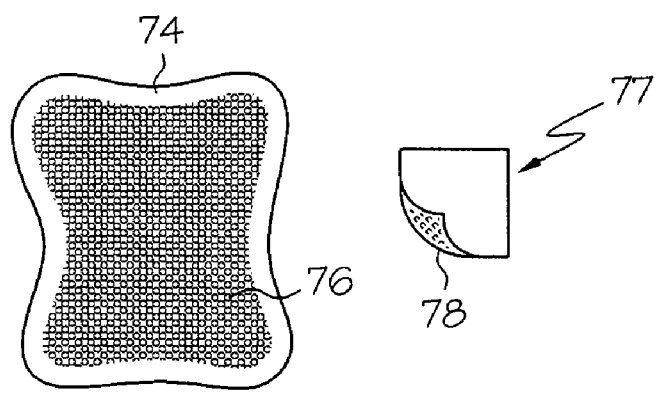
FIG. 8 is a diagrammatical depiction of an alternative embodiment.

FIGS. 7–12 depict alternative embodiments for permitting a marker element such as the marker element 38 that is depicted in FIG. 6 to be releasably attached to the shade element, such as the shade element 22 also shown in FIG. 6. As a shown in FIG. 7, the face 70 of the shade element 22 and the surface of the marker element 72 may both be constructed from a material and of a surface texture that promotes the marker element 72 to adhere to the face 70 by means of static cling. In the embodiment of FIG. 8, the face 74 of the shade element 22 may be provided with a plurality of loop elements 76, while one face of the 10 marker element 77 may be provided with a plurality of hook elements 78 to create a hook and loop fastener coupling. Alternatively, the loop elements may be provided on the marker element, while the hook elements may be provided on the face 70 of the shade element 22.

Figure 9:
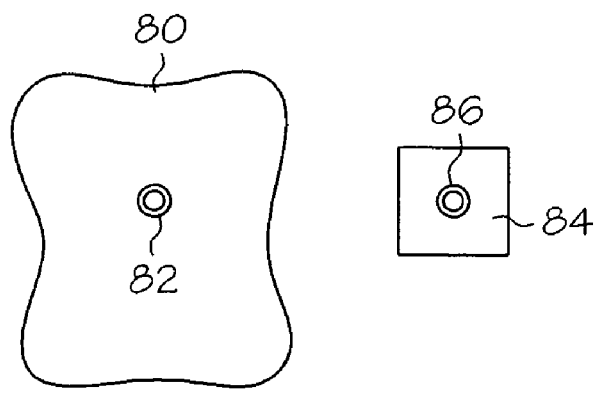
FIG. 9 is a diagrammatical depiction of yet another alternative embodiment.
Figure 10:
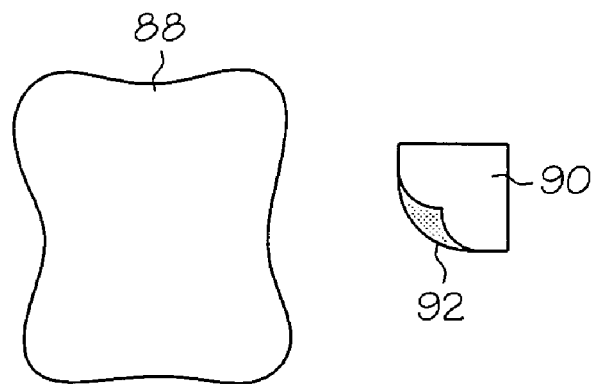
FIG. 10 is a diagrammatical depiction of a third alternative embodiment.

In the embodiment of FIG. 9, the face 80 of the shade element 22 includes a socket 82 for a snap, while the marker element 84 is provided with a mating snap element 86. In the embodiment of FIG. 10, a temporary adhesive 92 (for example a pressure sensitive adhesive such as ethylene vinyl acetate) may be provided on the marker element 90 and the face 88 of the shade element 22 is textured so as to promote temporary adhesion with the marker element 90.

Figure 11:
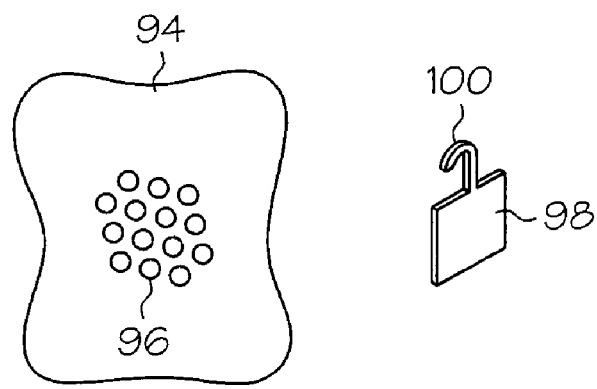
FIG. 11 is a diagrammatical depiction of a fourth alternative embodiment.
Figure 12:
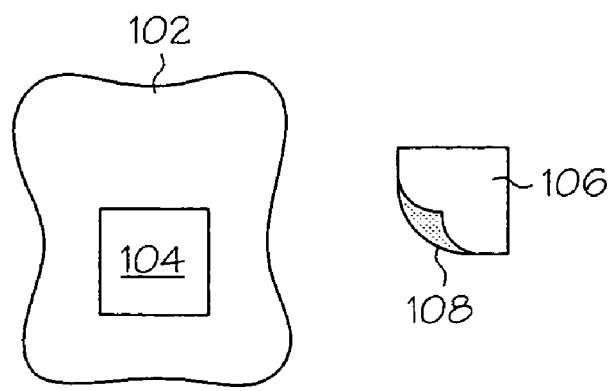
FIG. 12 is a diagrammatical depiction of a fifth alternative embodiment.

In the embodiment of FIG. 11, a number of holes 96 are defined in the face 94 of the shade element 22, and the marker element 98 includes at least one hook element 100 for engaging a selected one of the holes 96. In the embodiment of FIG. 12, a portion 104 of the face 102 of the shade element 22 may be metallized with a ferrous material, and a magnetic surface 108 may be provided on the marker element 106. It should be understood that the embodiments described herein are exemplary, and that any alternative attachment technology should be considered within the scope of the invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A sunshade for a vehicle, comprising:
   a housing;
   first mounting means for mounting said housing on a vehicle window;
   a drum member, rotatably mounted with respect to said housing;

a flexible, weblike shade element, said shade element being positioned so as to be wrapable about said drum member; and a retraction mechanism for enabling said shade element to be moved from a first, fully retracted position wherein most of said shade element is wrapped about said drum member and a second, extended position wherein said shade element is at least partially unwrapped from said drum member, said retraction mechanism comprising:

a biasing mechanism for biasing said drum member so that said shade element is urged toward said first, retracted position, and an arresting mechanism, said arresting mechanism being constructed and arranged so as to permit said drum member to be stopped when said shade element is in said second, extended position and in any of a plurality of predetermined intermediate positions that are between said first, fully retracted position and said second, extended position, said arresting mechanism further comprising controlled retraction structure for permitting a consumer to partially retract said shade element by a controlled predetermined distance;

whereby said weblike shade element may be utilized in more than one position wherein it is not being actively biased toward the retracted position.

2. A sunshade according to claim 1, wherein said housing is shaped and sized so as to preclude a person from being able to touch a portion of said shade element that is wrapped about said drum member, whereby the possibility of the person's fingers being pinched is reduced.

3. A sunshade according to claim 1, wherein said shade element has visible indicia provided thereon for purposes that are selected from the group consisting of informational purposes, educational purposes and entertainment purposes.

4. A sunshade according to claim 3, further comprising at least one marker element, and wherein said marker element and said shade element are constructed so that said marker element may be affixed to said shade element by a consumer.

5. A sunshade according to claim 4, wherein said marker element and said shade element are constructed so that said marker element is removably affixable to said shade element by a consumer, whereby the consumer will be able to remove said marker element from said shade element at some point in time after affixing it thereto.

6. A sunshade according to claim 4, wherein said marker element is sized and shaped so as to be functionally consistent with said visible indicia that is provided on said shade element.

7. A sunshade according to claim 1, further comprising at least one marker element, and wherein said marker element and said shade element are constructed so that said marker element may be affixed to said shade element by a consumer.

8. A sunshade according to claim 7, wherein said marker element and said shade element are constructed so that said marker element is removably affixable to said shade element by a consumer, whereby the consumer will be able to remove said marker element from said shade element at some point in time after affixing it thereto.

9. A sunshade according to claim 1, wherein said biasing mechanism comprises a spring that is functionally interposed between said housing and said drum member.

10. A sunshade according to claim 1, further comprising a control element, actuatable by a consumer, for disengaging said arresting mechanism, whereby said drum member will be urged by said biasing mechanism to cause said shade element to retract.

11. A sunshade according to claim 10, wherein said control element and said arresting mechanism are constructed and arranged to permit the consumer to actuate said control element in a first manner so as to cause said shade element to be retracted completely to said first, retracted position or in a second manner, so as to cause said controlled retraction structure to reengage in order to stop the retraction of said shade element in one of said intermediate positions.

12. A sunshade according to claim 11, wherein said control element and said arresting mechanism are constructed and arranged so that said first manner comprises actuating said control element for a first period of time and said second manner comprises actuating said control element for a second period of time that is less than said first period of time.

13. A sunshade according to claim 11, wherein said control element comprises a mechanical element that is depressible by the consumer, and said control element and said arresting mechanism are constructed and arranged so that said first manner comprises depressing said control element by a first distance and said second manner comprises depressing said control element by a second distance that is less than said first distance.

14. A sunshade according to claim 11, wherein said retraction mechanism further comprises a first clutch member and a second clutch member, and wherein said controlled retraction structure comprises releasable structure for preventing rotation of said first clutch member with respect to said housing.

15. A sunshade according to claim 14, wherein said control element comprises a mechanical element that is depressible by the consumer, and wherein said retraction mechanism is constructed and arranged so that depression of said mechanical element by the consumer by a first distance will disengage said first clutch member from said second clutch member, whereby said shade element will be permitted to retract.

16. A sunshade according to claim 15, wherein said controlled retraction structure comprises structure for stopping rotation of said first clutch member with respect to said housing after permitting a limited amount of such rotation to occur.

17. A sunshade according to claim 16, wherein said controlled retraction structure is constructed and arranged so as to release said releasable structure for preventing rotation of said first clutch member with respect to said housing when said mechanical element is depressed by the consumer by a second distance that is less than said first distance, whereby said first clutch member will be permitted to rotate a limited distance in order to partially retract said shade element before being stopped by said controlled retraction structure.

18. A sunshade according to claim 16, wherein said controlled retraction structure is constructed and arranged to stop rotation of said first clutch member with respect to said housing after permitting no more than one rotation of said clutch member with respect to said housing to occur.

19. A sunshade according to claim 1, further comprising gripping means mounted to a distal end of said shade element for facilitating gripping of said shade element by a consumer.

20. A sunshade according to claim 19, further comprising second mounting means, attached to said gripping means, for mounting said gripping means to a vehicle window, and wherein said gripping means and said second mounting means are constructed and arranged so as to facilitate disengagement of said second mounting means from the vehicle window by manipulating said gripping means.

21. A sunshade according to claim 20 wherein said second mounting means comprises more than one suction cup.

22. A sunshade according to claim 20, wherein said second mounting means comprises a suction cup, and wherein said gripping means is shaped, sized and attached to said suction cup in such a manner so as to permit the consumer to disengage said suction cup from the vehicle window by pulling on one end of said gripping means in a lever action.

23. A sunshade assembly for a vehicle, comprising:
a housing;
first mounting means for mounting said housing on a vehicle window;
a drum member, rotatably mounted with respect to said housing;
a flexible, weblike shade element, said shade element being positioned so as to be wrapable about said drum member; and
a retraction mechanism for enabling said shade element to be moved from a first, fully retracted position wherein most of said shade element is wrapped about said drum member and a second, extended position wherein said shade element is at least partially unwrapped from said drum member;
at least one marker element, said marker element and said shade element being constructed so that said marker element may be affixed to said shade element by a consumer.

24. A sunshade assembly according to claim 23, wherein said shade element has visible indicia provided thereon for purposes that are selected from the group consisting of informational purposes, educational purposes and entertainment purposes.

25. A sunshade assembly according to claim 24, wherein said marker element is sized and shaped so as to be functionally consistent with said visible indicia that is provided on said shade element.

26. A sunshade assembly according to claim 24, wherein said marker element and said shade element are constructed so that said marker element is removably affixable to said shade element by a consumer, whereby the consumer will be able to remove said marker element from said shade element at some point in time after affixing it thereto.

27. A sunshade for a vehicle, comprising:
a housing;
first mounting means for mounting said housing on a vehicle window;
a drum member, rotatably mounted with respect to said housing;
a flexible, weblike shade element, said shade element being positioned so as to be wrapable about said drum member;
a retraction mechanism for enabling said shade element to be moved to any one of a number of different positions including a first, retracted position wherein most of said shade element is wrapped about said drum member and a second, extended position wherein said shade element is at least partially unwrapped from said drum member; and wherein
said housing is shaped and sized so as to preclude a person from being able to touch a portion of said shade element that is wrapped about said drum member, whereby the possibility of the person's fingers being pinched is reduced.

28. A sunshade for a vehicle, comprising:
a housing;
first mounting means for mounting said housing on a vehicle window;
a drum member, rotatably mounted with respect to said housing;
a flexible, weblike shade element, said shade element being positioned so as to be wrapable about said drum member;
a retraction mechanism for enabling said shade element to be moved to any one of a number of different positions including a first, retracted position wherein most of said shade element is wrapped about said drum member and a second, extended position wherein said shade element is at least partially unwrapped from said drum member;
a gripping member, mounted to a distal end of said shade element, for facilitating gripping of said shade element by a consumer; and
second mounting means, attached to said gripping member, for mounting said gripping member to a vehicle window, said second mounting means comprising at least two suction cups, said suction cups being aligned with each other along a common axis, said gripping member being shaped so as to provide a lever arm of sufficient length in a direction that is perpendicular to said common axis to permit a consumer to conveniently disengage said suction cup from a vehicle window, said length being within a range of about 0.4 in. to about 2.5 in.

29. A sunshade for a vehicle according to claim 28, wherein each of said suction cups are constructed and arranged so as to have a force of adhesion to a vehicle window that is within a range of about 0.1 lb. of force to about 3.5 lb. of force.

30. A sunshade for a vehicle according to claim 29, wherein each of said suction cups are constructed and arranged so as to have a force of adhesion to a vehicle window that is within a range of about 0.5 lb. of force to about 2.8 lb. of force.

31. A sunshade for a vehicle according to claim 28, wherein said gripping member is shaped so that said lever arm extends for a distance that is within a range of about 0.4 in. to about 2.5 in.

32. A sunshade for a vehicle according to claim 31, wherein said gripping member is shaped so that said lever arm extends for a distance that is within a range of about 0.5 in. to about 1.5 in.

33. A sunshade for a vehicle according to claim 28, wherein said at least one suction cup is integrally molded with said gripping member.

34. A sunshade for a vehicle having at least one vehicle door and a vehicle window that can be raised and lowered out of and into the door, comprising:
a housing;
first mounting means for mounting said housing on a first portion of the vehicle window;
a drum member, rotatably mounted with respect to said housing;
a flexible, weblike shade element, said shade element being positioned so as to be wrapable about said drum member;
a retraction mechanism for enabling said shade element to be moved to any one of a number of different positions including a first, retracted position wherein most of said shade element is wrapped about said drum member and a second, extended position wherein said shade element is at least partially unwrapped from said drum member;

a gripping member, mounted to a distal end of said shade element, for facilitating gripping of said shade element by a consumer; and second mounting means, attached to said gripping member, for mounting said gripping member to a second portion of the vehicle window, and wherein said gripping member and said second mounting means are constructed and arranged so as to facilitate disengagement of said second mounting means from the second portion of the vehicle window when the second portion of the vehicle window is attempted to be lowered into the vehicle door.

35. A sunshade for a vehicle according to claim 34, wherein said second mounting means comprises at least one suction cup that is attached to said gripping member, and wherein said gripping member is shaped so as to provide a lever arm of sufficient length to engage the vehicle door in order to disengage said suction cup from the second portion of the vehicle window when the vehicle window is attempted to be lowered into the vehicle door.

36. A sunshade for a vehicle according to claim 35, wherein said suction cup and said gripping member are configured so that said gripping member will engage the vehicle door before said suction cup when the vehicle window is attempted to be lowered into the vehicle door.

37. A sunshade for a vehicle, comprising:
a housing;
first mounting means for mounting said housing on a vehicle window;
a drum member, rotatably mounted with respect to said housing;
a flexible, weblike shade element, said shade element being positioned so as to be wrapable about said drum member; and
a retraction mechanism for enabling a consumer by depressing a mechanical control element using just one hand to move the shade element to any one of a plurality of different predetermined indexed positions including a first, retracted position wherein most of said shade element is wrapped about said drum member, a second, extended position wherein said shade element is at least partially unwrapped from said drum member and at least one predetermined indexed intermediate position.

38. A sunshade according to claim 37, wherein said retraction mechanism is constructed and arranged to permit the consumer to actuate said control element in a first manner so as to cause said shade element to be retracted completely to said first, retracted position or in a second manner, so as to cause said retraction mechanism to reengage in order to stop the retraction of said shade element in said predetermined indexed intermediate position.

39. A sunshade according to claim 38, wherein said retraction mechanism is constructed and arranged so that said first manner comprises depressing said mechanical control element by a first distance and said second manner comprises depressing said control element by a second distance that is less than said first distance.

40. A sunshade for a vehicle, comprising:
a housing;
first mounting means for mounting said housing on a vehicle window;
a drum member, rotatably mounted with respect to said housing;
a flexible, weblike shade element, said shade element being positioned so as to be wrapable about said drum member;
a retraction mechanism for enabling said shade element to be moved to any one of a number of different positions including a first, retracted position wherein most of said shade element is wrapped about said drum member and a second, extended position wherein said shade element is at least partially unwrapped from said drum member;
a gripping member, mounted to a distal end of said shade element, for facilitating gripping of said shade element by a consumer; and
second mounting means, attached to said gripping member, for mounting said gripping member to a vehicle window, said second mounting means comprising at least one suction cup, said gripping member being shaped so as to provide a lever arm of sufficient length from said suction cup to permit a consumer to conveniently disengage said suction cup from a vehicle window, said length being within a range of about 0.4 in. to about 2.5 in.

* * * * *